United States Patent [19]
Christophersen et al.

[11] Patent Number: 6,090,421
[45] Date of Patent: Jul. 18, 2000

[54] SPRAYABLE BROWNING COMPOSITION

[75] Inventors: Martin Christophersen, Horn; Johannes Mattheus Cornelissen, Zug; Susanne Wenger, Arbon, all of Switzerland

[73] Assignee: Unilever Patent Holdings BV, Vlaardingen, Netherlands

[21] Appl. No.: 09/198,398

[22] Filed: Nov. 24, 1998

[30] Foreign Application Priority Data

Nov. 24, 1997 [EP] European Pat. Off. ............... 97203637

[51] Int. Cl.$^7$ ................ A23L 1/275; B05B 1/02
[52] U.S. Cl. ............. 426/115; 426/262; 426/268; 426/250; 118/13
[58] Field of Search ................ 426/115, 116, 426/250, 262, 265, 268, 540, 602, 466, 467; 118/13

[56] References Cited

U.S. PATENT DOCUMENTS

| | | | |
|---|---|---|---|
| 4,142,003 | 2/1979 | Sejpal | 426/601 |
| 5,045,337 | 9/1991 | El-Nokaly et al. | 426/602 |
| 5,196,219 | 3/1993 | Hsu et al. | 426/302 |
| 5,326,582 | 7/1994 | Hair et al. | 426/613 |
| 5,466,478 | 11/1995 | Brockhus et al. | 426/602 |
| 5,738,891 | 4/1998 | Andreae et al. | 426/113 |

FOREIGN PATENT DOCUMENTS 2 101 868    1/1983    United Kingdom ............ A23L 1/221

*Primary Examiner*—Keith D. Hendricks
*Attorney, Agent, or Firm*—Pillsbury Madison & Sutro LLP

[57] ABSTRACT

The present invention relates to a browning composition which, when applied to a foodstuff, in particular meat or a meat product, imparts a browning effect to the surface of the substrate to which it is applied. More in particular, the present invention relates to a browning composition which can be applied by spraying on the foodstuff. This is achieved by dissolving or dispersing a browning agent in a water phase, and mix such water phase with an oil or fat phase to form an emulsion.

12 Claims, No Drawings

SPRAYABLE BROWNING COMPOSITION

FIELD OF THE INVENTION

The present invention relates to a browning composition which, when applied to a foodstuff, in particular meat or a meat product, imparts a browning effect to the surface of the substrate to which it is applied. More in particular, the present invention relates to a browning composition which can be applied by spraying on the foodstuff.

BACKGROUND OF THE INVENTION

It is a known problem in modern cooking that foodstuffs, in particular meat or meatproducts, often fail to have a desirable appearance in terms of colour, crispness, aroma, etcetera after preparation and before consumption. More specifically, when preparing foodstuffs having a savoury taste, e.g. meat and meat products, full meals, meal components, harty snacks, it is often desired that the surface of the product, such as the upper side, has a nice baked, grilled or fried appearance, including a golden-brown color. Normally, this is obtained when cooking in the traditional way, in which the foodstuff is allowed for a certain amount of time to develop such a brown or golden brown appearance.

However, when such foodstuffs are prepared or heated in more modern style cooking, such as by microwave cooking, steam ovens, combisteamers, etcetera such a desired appearance will not or not sufficiently develop. Such methods of preparing meat or meatproducts are often used to prepare foodstuffs on large scale, such as canteens, hospitals, restaurants. Also, this problem may appear domestically with microwave cooking of meat and meat products. Yet another area where this problem may occur is in the preparation of half- or precooked foodstuffs intended as convenience products, which are often heated by the end user by microwave cooking.

A known manner of overcoming this problem is by applying a so-called browning agent to the foodstuff that is to be prepared prior to or during preparation (cooking). Such browning agents, as are known e.g. from U.S. Pat. No. 5,397,582 and U.S. Pat. No. 5,393,542, generally contain a mixture of carbohydrates which may have been treated by heating, pyrolysation, burning, etcetera. Optionally, other components such as peptides, amino acids, salt, herbs, spices, colors etcetera may also be present.

Although such browning agents may give satisfactory results, the manner of application of such browning agent to the foodstuff is not ideal. The browning agents, which can be obtained in the form of a powder or aqueous solution or dispersion, may be difficult to apply to the foodstuff in the dosage desired, in an even and hygienic way.

SUMMARY OF THE INVENTION

The aim of the present invention is to provide a formulation containing a browning agent as known in the art, but in the form which is easy to apply by spraying on the foodstuff concerned. The formulation should be such that good browning results are obtained in a wide range of cooking/heating methods such a s microwave heating, combisteamers, ovens, deep-frying, shallow frying, baking etcetera. Said formulation should be such that the spraying can be done using relatively simple equipment, using e.g. hand-powered pumping mechanisms or pressurized cans, contrary to methods which require the use of high pressure equipment. Preferably, the formulation should be such that the browning agent adheres well to the substrate (e.g. meatmor pastry).

It has now been found that good results w.r.t. the above can be achieved by a sprayable emulsion for enhancing browning of foodstuffs, in particular meat or meat products, which emulsion comprises a fat or oil phase, in an amount of 80–97% by weight, a water phase, in an amount of 3–20% by weight, a browning agent, dissolved or dispersed (mainly) in the water phase.

In the above, it is preferred that the fat or oil phase is present in an amount of 85–97%, and the water phase in an amount of 3–15% (all by weight).

DETAILED DESCRIPTION OF THE INVENTION

It was found that the above formulation was both easy to apply using simple spraying apparatus and also provided excellent browning results when applied to foodstuffs such as harty snacks, meat, meat products, etcetera. In particular when such products are prepared or heated in more modern style cooking, such as by microwave cooking, steam ovens or combisteamers, but the products could also be applied with good results when e.g. baking and shallow frying.

Although the browning agents as such were known, they were generally applied in either an aqueous solution or a oil or fat dispersion. In the first case, it was noted that insufficient browning was the result, as presence of some oil or fat enhances the browning imparted by the browning agent. Additionally, the presence of a fat or oil can be necessary for obtaining good cooking results, e.g. in the case of shallow frying.

However, applying the browning agent when it is dispersed in a fat or oil (without substantial amounts of water being present) browning is also not optimal, and in particular uneven browning may be the result. This is mainly due to insufficient heat transfer and difficulties in application of the browning agent, when it is dispersed in the fat phase.

Additionally, it was found that the emulsion as defined above could be sprayed (e.g. on the foodstuff) using standard equipment only. Hence, by using the emulsion according to the invention the use of complicated, expensive high pressure professional spraying equipment can be dispensed with. Also, since the formulations according to the invention are sprayable, this opens the possibility for easy application in a convenient, hygienic way, without the need for application by brushing, dipping etcetera, which is in particular advantageous from a hygienic point of view.

In the present invention, it is preferred that the water phase is present in the emulsion in an amount of 5–10% by weight. Consequently, the amount of fat phase is preferably from 95–90% by weight.

In this invention the browning agents as such are known in the art, e.g. from U.S. Pat. No. 5,397,582 and U.S. Pat. No. 5,393,542. They generally contain a mixture of carbohydrates which may have been treated by heating, pyrolysation, burning, etcetera. Optionally, other components such as peptides, amino acids, salt, herbs, spices, colors etcetera may also be present. In general, all or most of the browning agent will be dissolved in the water present in the emulsion, however, given the fact that these browning compositions may contain some matter which is difficult to dissolve, some of the browning agent may be present dispersed in the water phase. Nevertheless, it is preferred if the browning agent is chosen such that it is (substantially completely) dissolved in the water phase. The amount of browning agent needed in the emulsion according to the invention depends on the nature of the browning agent, the foodstuff to which it is applied, and the desired result. In most cases, the amount of browning agent is from 0.1 to 5% by weight, based on the total composition, preferably 1–3%. In case the amount of browning agent to be used is high (e.g. 3–5%), the water phase generally amounts for 8–15% by weight, based on the total composition. In case a lower amount of browning agent is used (0.1–2%), the water phase can consequently be in the lower end of the range (3–10%).

As the formulation according to the invention is an emulsion, it may be desired to stabilize the emulsion in some way. This may be achieved by adding emulsifiers and stabilizers as are known in the art. It is preferred for stabilization, however, if in the emulsion according to the invention the oil or fat phase comprises:

a liquid oil in an amount of 90–99.5% by weight based on the total amount of oil or fat and a crystallized fat phase in an amount of 0.5–10% by weight based on the total amount of oil or fat.

The small amount of fat crystals has a stabilizing effect on the composition. More preferred in this respect are amounts for the liquid oil and crystallized fat of 95–99% and 1–5%, respectively, based on the total oil or fat phase.

The fats and oils used for the formulations according to the invention are preferably of vegetable origin. The crystallized fat phase preferably comprises fully hardened vegetable fat.

The emulsions according to the invention are preferably water in oil type emulsions.

Although fat/oil, water and the browning agent are the major constituents (in terms of function), other components may be present as well. In this respect, it is preferred to include in the formulations according to the invention starch, modified starch and starch-like matter. Such components may contribute to wettability, color, flavour and crust formation. Other components that may be present are salt, herbs, spices, colorants, etcetera. Starch and modified starch in this respect are preferred, in order to influence the rheology in such a way that the composition (browning agent) sticks well to the surface of the material to be treated. For such purposes, the amount of (modified)starch to be used ranges from 0.5–5%, preferably from 1–3% by weight, based on the total composition.

An acid component may be incorporated into the water phase in order to lower the pH of the water phase in such an extent that microbiological spoilage is prevented or reduced. Lactic and citric acid are preferred in this respect.

As the emulsions according to the invention are sprayable from simple spraying equipment (contrary to e.g. emulsions containing more water) the invention also extends to such equipment containing the emulsions according to the invention. Such containers (bottles, cans, packs, etcetera) generally comprise dispersing means, pressurizing means and the emulsion according to the invention. As the compositions according to the invention are preferably sprayed on the foodstuff, the dispersing means will generally comprise a nozzle. In order to push the emulsion out of the container (through the nozzle) some sort of pressurizing means will be needed. As the emulsion is well sprayable using simple equipment, said pressurizing means may be provided by a hand-operated pump or pressurized gas. In the latter case, the emulsion may be contained in a pressurized can.

The invention further extends to the use (by applying it to the foodstuff) of the compositions according to the invention for imparting a brown or golden brown color to foodstuffs, by spraying said emulsion to the foodstuffs prior to a heating step.

The invention is further exemplified by the following examples, which are to be understood as to be non-limiting.

EXAMPLES

A water phase and an oil phase were prepared with the following compositions (percentages by weight, based on the total composition)

| Water phase | |
| --- | --- |
| salt | 0.3% |
| Smokez MB12 (dry) | 2.5% |
| starch | 2.0% |
| water | 5.2% |
| Oil/fat phase | |
| sunflower oil | 88.8% |
| hardened soy bean oil (BO60) | 1.2% |

To the water phase was added a small amount of lactic acid (about 0.005%), sufficient to lower the pH of the water phase to about 3.5. Both phases were mixed to form an emulsion. The so-prepared emulsion contains a water phase of 10% by weight, and an oil/fat phase of 90% by weight.

The emulsion was easy to spray using a hand-operated pump (according the type used domestically for spraying plants), and when applied did impart a very good browning effect to meat upon cooking.

Other emulsions were prepared, along the same lines, but in which the water phase amounted for either 7.5% and for 12% by weight, based on the total composition, instead of the 10% above. These emulsions were also well sprayable, and did show good browning behavior.

Yet other emulsions were prepared, in which the amount of starch was lowered to 1%. Again, these were well sprayable and did show good browning effect.

What is claimed is:

1. A spray container for dispensing a sprayable emulsion, said container comprising dispersing means, pressurizing means and a sprayable emulsion for browning of foodstuffs, said emulsion comprising a fat or oil phase, in an amount of 80–97% by weight, a water phase, in an amount of 3–20% by weight, and a browning agent, dissolved or dispersed in the water phase.

2. Container according to claim 1, wherein the water phase of the sprayable emulsion is present in an amount of 5–10% by weight.

3. Container according to claim 1, wherein the oil or fat phase of the sprayable emulsion comprises a liquid oil in an amount of 90–99.5% by weight based on the total amount of oil or fat and a crystallized fat phase in an amount of 0.5–10% by weight based on the total amount of oil or fat.

4. Container according to claim 3, wherein the oil or fat phase of the sprayable emulsion comprises a liquid phase in an amount of 95–98.5% by weight based on the oil or fat phase and a crystallized fat phase in an amount of 1–5% by weight based on the oil or fat phase.

5. Container according to claim 3 or 4, wherein the crystallized fat phase of the sprayable emulsion comprises fully hardened vegetable fat.

6. Container according to claim 1, wherein the browning agent of the sprayable emulsion is dissolved in the water phase.

7. Container according to claim 1, wherein the browning agent is present in an amount of from 0.1–5%, by weight, based on the total weight of the sprayable emulsion.

8. Container according to claim 1, wherein the sprayable emulsion further comprises starch and/or modified starch, in an amount of from 0.5–5% by weight, based on the total weight of the sprayable emulsion.

9. Container according to claim 1, wherein the dispersing means comprises a nozzle.

10. Container according to claim 1, wherein the pressurizing means comprises a hand-operated pump.

11. Container according to claim 1, wherein the pressurizing means comprises a pressurized gas.

12. In a method for imparting a browning color to foodstuff, the improvement which comprises spraying the foodstuff, prior to heating the same, with an emulsion which comprises a fat or oil phase, in an amount of 80–97% by weight, a water phase, in an amount of 3–20% by weight, and a browning agent, dissolved or dispersed in the water phase.

\* \* \* \* \*